United States Patent
Ahn et al.

(10) Patent No.: US 8,754,875 B2
(45) Date of Patent: Jun. 17, 2014

(54) LIGHT SENSING CIRCUIT, TOUCH PANEL INCLUDING THE SAME, AND METHOD OF DRIVING THE LIGHT SENSING CIRCUIT

(75) Inventors: Soon-Sung Ahn, Yongin (KR); Yong-Sung Park, Yongin (KR); Do-Youb Kim, Yongin (KR); Deok-Young Choi, Yongin (KR); In-Ho Choi, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 1276 days.

(21) Appl. No.: 12/581,292

(22) Filed: Oct. 19, 2009

(65) Prior Publication Data

US 2010/0097354 A1 Apr. 22, 2010

(30) Foreign Application Priority Data

Oct. 17, 2008 (KR) ........................ 10-2008-0102112

(51) Int. Cl.
*G06F 3/038* (2013.01)
*H01L 31/00* (2006.01)

(52) U.S. Cl.
USPC ......... 345/204; 345/207; 345/175; 250/214.1

(58) Field of Classification Search
USPC ................................ 345/156–175, 204–207; 178/18.09–18.11; 348/308
See application file for complete search history.

(56) References Cited

U.S. PATENT DOCUMENTS

| | | | | |
|---|---|---|---|---|
| 5,548,112 A | * | 8/1996 | Nakase et al. | 250/214 C |
| 7,288,754 B2 | * | 10/2007 | Tsai | 250/214 A |
| 7,462,813 B2 | * | 12/2008 | Hirose et al. | 250/214.1 |
| 7,671,320 B2 | * | 3/2010 | Hirose et al. | 250/214.1 |
| 8,304,734 B2 | * | 11/2012 | Ishibashi et al. | 250/352 |
| 8,466,904 B2 | * | 6/2013 | Ahn et al. | 345/204 |
| 2005/0212916 A1 | * | 9/2005 | Nakamura et al. | 348/207.99 |
| 2005/0218302 A1 | * | 10/2005 | Shin et al. | 250/214 R |
| 2007/0278388 A1 | * | 12/2007 | Hirose et al. | 250/214 R |
| 2008/0138092 A1 | * | 6/2008 | Nagakubo | 398/202 |

FOREIGN PATENT DOCUMENTS

| | | |
|---|---|---|
| JP | 10-233741 | 9/1998 |
| JP | 2001013005 A * | 1/2001 |
| JP | 2006-202984 | 8/2006 |
| KR | 2000-0000634 | 1/2000 |
| KR | 10-0854774 | 8/2008 |

OTHER PUBLICATIONS

English-language abstract of Korean Patent Publication No. 10-2008-0065804.
Korean Office Action dated Jul. 28, 2010, issued in corresponding Korean Patent Application No. 10-2008-0102112.

* cited by examiner

*Primary Examiner* — Rodney Amadiz
(74) *Attorney, Agent, or Firm* — Christie, Parker & Hale, LLP (57) ABSTRACT

A light sensing circuit of a touch panel includes a photodiode including an anode and a cathode; a driving transistor including a gate electrode connected to the cathode of the photodiode, a first electrode to receive a first ground voltage, and a second electrode; a first switching transistor including a first electrode connected to the second electrode of the driving transistor, a second electrode to output a data signal, and a gate electrode to receive a scan signal; a first capacitor including a first terminal connected to the cathode of the photodiode, and a second terminal; and a voltage compensating unit to apply a compensation voltage to the second terminal of the first capacitor.

20 Claims, 5 Drawing Sheets

LIGHT SENSING CIRCUIT, TOUCH PANEL INCLUDING THE SAME, AND METHOD OF DRIVING THE LIGHT SENSING CIRCUIT

CROSS-REFERENCE TO RELATED APPLICATIONS

This application claims the benefit of Korean Patent Application No. 10-2008-0102112 filed on Oct. 17, 2008, in the Korean Intellectual Property Office, the disclosure of which is incorporated herein by reference in its entirety.

BACKGROUND OF THE INVENTION

1. Field of the Invention

Aspects of the invention relate to a light sensing circuit, a touch panel including the same, and a method of driving the light sensing circuit, and more particularly, to a light sensing circuit that can accurately detect the brightness of light incident on a photodiode, a touch panel including the light sensing circuit, and a method of driving the light sensing circuit.

2. Description of the Related Art

In general, input devices, such as a mouse or a keyboard, are used to input a command to a computer. A remote control, which is also an input device, is used to control a device, such as a digital television, so that a user can select a specific function. However, users who are not skilled in using such a mouse, keyboard, or remote control have difficulty using these input devices.

A touch panel or touch screen is an input device that has been suggested as an attempt to solve the above problem. A touch panel is an input device that allows a user to input a command by directly touching a display panel with his or her finger or a pen instead of using a mouse, a keyboard, or a remote control.

Since a command can be input by touching a touch panel with a finger or the like, users having difficulty using input devices, such as a mouse, a keyboard, and a remote control, can easily use a digital device, such as a computer, by using such a touch panel to input commands. There are different types of touch panel technology that differ according to a method of recognizing an input: including capacitive technology, resistive overlay technology, infrared beam technology, surface acoustic wave technology using ultrasonic waves, strain gauge technology, piezoelectric technology, and light sensing technology.

Light sensing technology involves forming a photodiode in a display panel and sensing current generated due to light incident on the photodiode to recognize a touch by a finger. Such light sensing technology has advantages in that a touch panel can be simply manufactured because a photodiode used in the light sensing technology can be formed at the same time as a driving circuit of a display panel, such as a liquid crystal display (LCD) or an organic light emitting diode (OLED) display, is formed, and the thickness of the touch panel can be reduced since an additional layer does not need to be formed on the display panel unlike resistive overlay technology or capacitive technology.

However, the current generated by the photodiode is affected by the temperature of the photodiode or the temperature of ambient air surrounding the photodiode as well as by the brightness of the light incident on the photodiode.

Figure 1:
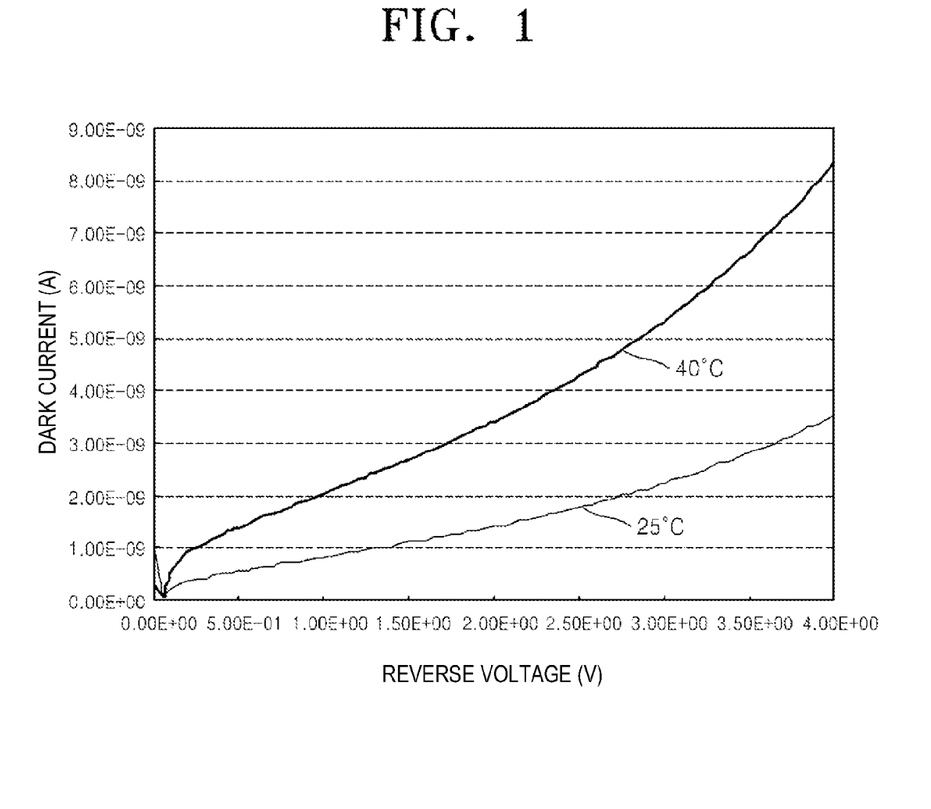
FIG. 1 is a graph showing a relationship between current flowing in a photodiode and the brightness of light incident on the photodiode at different temperatures.

FIG. 1 is a graph showing a relationship between a dark current flowing in a photodiode and a reverse voltage applied across the photodiode at different temperatures. The dark current is a current that flows in the photodiode when the reverse voltage is applied across the photodiode and no light is incident on the photodiode. In FIG. 1, the X-axis represents the reverse voltage applied across the photodiode in volts (V), and the Y-axis represents the dark current flowing in the photodiode in amps (A). The upper curve is obtained at a temperature of 40° C., and the lower curve is obtained at a temperature of 25° C.

Referring to FIG. 1, as the temperature increases, a larger amount of dark current flows at the same reverse voltage. Accordingly, as the ambient temperature changes, the amount of current flowing in a photodiode included in a touch panel changes because the current flowing in the photodiode when light is incident on the photodiode is a sum of the dark current and a current that depends on the brightness of the light incident on the photodiode. Hence, although light with the same brightness is incident on the photodiode, the detected brightness as indicated by the current flowing in the photodiode varies depending on the ambient temperature, which can cause errors in determining whether a user has touched the touch panel.

SUMMARY OF THE INVENTION

Aspects of the invention relate to a light sensing circuit that can accurately detect the brightness of light incident on a photodiode by removing a current component generated due to ambient temperature from current generated by the photodiode, a touch panel including the light sensing circuit, and a method of driving the light sensing circuit.

According to an aspect of the invention, a light sensing circuit includes a photodiode to receive external light, the photodiode including an anode and a cathode; an amplifying unit to amplify a current generated by the photodiode due to the received external light at an ambient temperature; and a voltage compensating unit to adjust a voltage of the cathode of the photodiode based on the ambient temperature.

According to an aspect of the invention, the voltage compensating unit includes a dark diode blocked from receiving the external light, the dark diode including an anode and a cathode; a voltage generating unit to generate a compensation voltage based on a current generated by the dark diode at the ambient temperature, the voltage generating unit including an input terminal and an output terminal; and a first capacitor including a first terminal connected to the cathode of the photodiode, and a second terminal connected to the output terminal of the voltage generating unit.

According to an aspect of the invention, the voltage compensating unit further includes a temperature measuring unit to measure the ambient temperature by sensing the current generated by the dark diode, and the voltage generating unit determines a magnitude of the compensation voltage based on the ambient temperature measured by the temperature measuring unit.

According to an aspect of the invention, the light sensing circuit further includes a second capacitor including a first terminal connected to the output terminal of the voltage generating unit, and a second terminal connected to the cathode of the dark diode.

According to an aspect of the invention, the light sensing circuit further includes a switch connected between the first terminal of the second capacitor and the second terminal of the second capacitor.

According to an aspect of the invention, a light sensing circuit includes a photodiode including an anode and a cathode; a driving transistor including a gate electrode connected to the cathode of the photodiode, a first electrode to receive a first ground voltage, and a second electrode; a first switching transistor including a first electrode connected to the second electrode of the driving transistor, a second electrode to output a data signal, and a gate electrode to receive a scan signal; a first capacitor including a first terminal connected to the cathode of the photodiode, and a second terminal; and a voltage compensating unit to apply a compensation voltage to the second terminal of the first capacitor.

According to an aspect of the invention, the voltage compensating unit includes a voltage supply device including an input terminal and an output terminal; a second capacitor including a first terminal connected to the output terminal of the voltage supply device, and a second terminal connected to the input terminal of the voltage supply device; and a dark diode including a cathode connected to the input terminal of the voltage supply device, and an anode to receive a second ground voltage.

According to an aspect of the invention, the voltage supply device includes an input signal inverting device.

According to an aspect of the invention, the input signal inverting device includes an operational amplifier.

According to an aspect of the invention, the light sensing circuit further includes a switch connected between the first terminal of the second capacitor and the second terminal of the second capacitor.

According to an aspect of the invention, the light sensing circuit further includes a reset transistor including a first electrode connected to the cathode of the photodiode, a second electrode to receive an initialization voltage, and a gate electrode to receive a reset signal is applied.

According to an aspect of the invention, the light sensing circuit further includes a second switching transistor including a gate electrode to receive the scan signal, a first electrode to receive the first ground voltage, and a second electrode connected to the first electrode of the driving transistor.

According to an aspect of the invention, there is provided a method of driving a light sensing circuit that senses a brightness of external light incident on a photodiode based on a current generated by the photodiode due to the incident light at an ambient temperature, the method including measuring the ambient temperature; and removing an ambient temperature current component from the current generated by the photodiode based on the measured ambient temperature.

According to an aspect of the invention, the removing of the ambient temperature current component includes generating a compensation voltage based on the measured ambient temperature; and applying the compensation voltage to an anode of the photodiode.

According to an aspect of the invention, the measuring of the ambient temperature includes measuring the ambient temperature using a dark diode blocked from receiving the external light.

According to an aspect of the invention, a touch panel includes a plurality of light sensing circuits; a plurality of scan lines to transmit a scan signal to the plurality of light sensing circuits; a plurality of reset lines to transmit a reset signal to the plurality of light sensing circuits; and a plurality of data output lines to output a brightness current from the plurality of light sensing circuits; wherein each of the plurality of light sensing circuits includes a photodiode including an anode and a cathode; a driving transistor including a gate electrode connected to the cathode of the photodiode, a first electrode to receive a first ground voltage, and a second electrode; a first switching transistor including a first electrode connected to the second electrode of the driving transistor, a second electrode connected to one of the data output lines, and a gate electrode connected to one of the scan signal lines; a first capacitor comprising a first terminal connected to the cathode of the photodiode, and a second terminal; and a voltage compensating unit to apply a compensation voltage to the second terminal of the first capacitor.

According to an aspect of the invention, the touch panel further includes a scan driving unit connected to the plurality of scan lines to supply the scan signal.

According to an aspect of the invention, the touch panel further includes a reset driving unit connected to the plurality of reset lines to supply the reset signal.

According to an aspect of the invention, the touch panel further includes a sensing output unit connected to the plurality of data output lines to receive the brightness current and output brightness data of light incident on the light sensing circuits.

According to an aspect of the invention, the touch panel further includes a controller to determine a location of a touch on the touch panel based on the brightness data.

According to an aspect of the invention, the touch panel further includes a plurality of display circuits; a plurality of data lines to transmit a data signal to the plurality of display circuits; and a data driving unit connected to the plurality of data lines to supply the data signal.

According to an aspect of the invention, each of the plurality of display circuits includes a pixel circuit of an organic light emitting diode display device.

Additional aspects and/or advantages of the invention will be set forth in part in the description that follows and, in part, will be obvious from the description, or may be learned by practice of the invention.

BRIEF DESCRIPTION OF THE DRAWINGS

The above and/or other aspects and advantages of the invention will become apparent and more readily appreciated from the following description of embodiments of the invention, taken in conjunction with the accompanying drawings of which.

DETAILED DESCRIPTION OF THE EMBODIMENTS

Reference will now be made in detail to embodiments of the invention, examples of which are shown in the accompanying drawings, wherein like reference numerals refer to like elements throughout. The embodiments are described below in order to explain the invention by referring to the figures.

Figure 2:
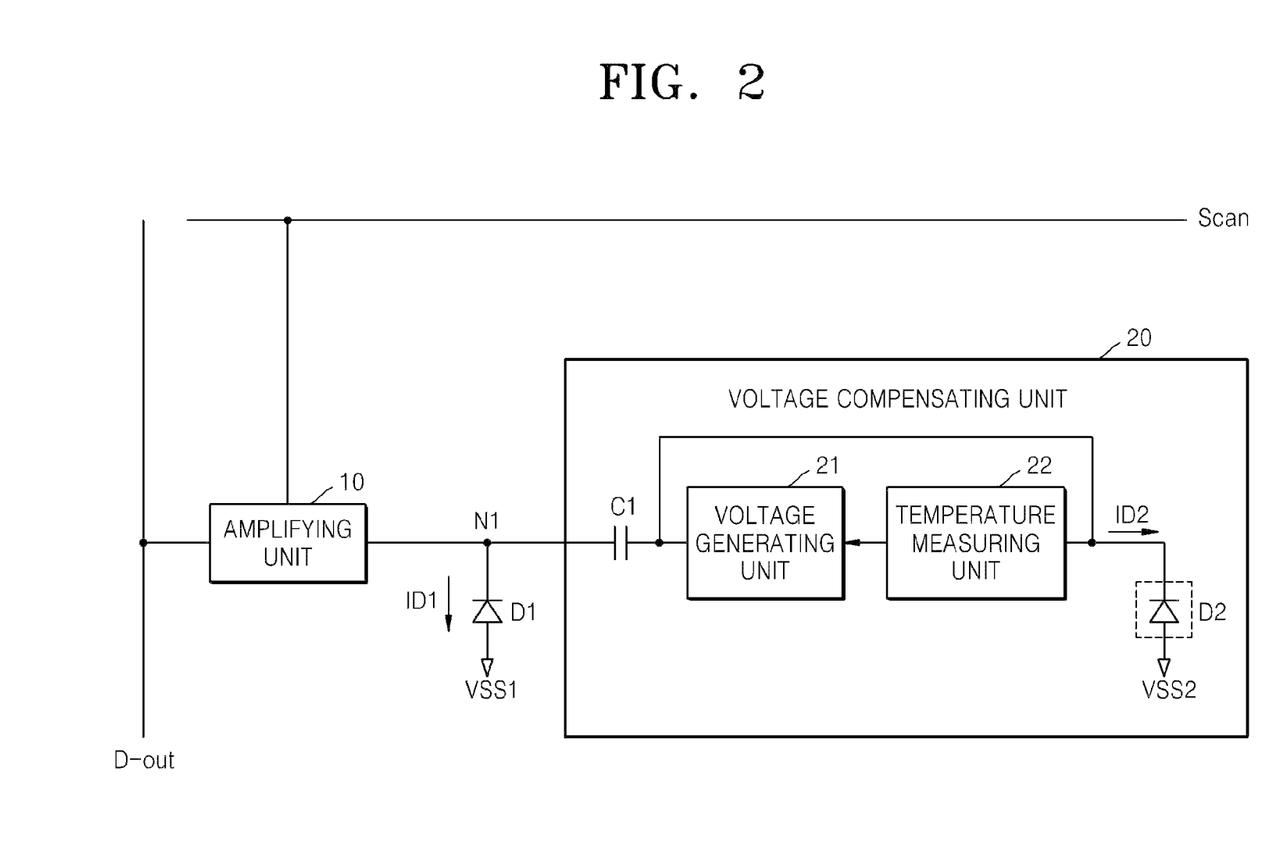
FIG. 2 shows a light sensing circuit according to an aspect of the invention.

FIG. 2 shows a light sensing circuit according to an aspect of the invention. Referring to FIG. 2, the light sensing circuit includes a photodiode D1, an amplifying unit 10, and a voltage compensating unit 20. The photodiode D1 receives external light and generates a first current ID1. The photodiode D1 includes an anode and a cathode. A first ground voltage VSS1 is applied to the anode of the photodiode D1. The cathode of the photodiode D1 is connected to a first node N1. The photodiode D1 is reverse biased, unlike a typical diode. Accordingly, the potential of the anode must be lower than the potential of the cathode. If light is incident from the outside while the photodiode D1 is reverse biased, the first current ID1 is generated according to the brightness of the light. However, it is understood that aspects of the invention are not limited to using the photodiode D1, and any element in which a voltage or current depends on the brightness of light incident on the element can be used.

The amplifying unit 10 amplifies the first current ID1 generated by the photodiode D1 and converts the amplified first current ID1 to a voltage or current. The amplifying unit 10 may include a plurality of transistors, and may further include a capacitor. Alternatively, the amplifying unit 10 may include an operational amplifier (op amp).

A scan line Scan is connected to the amplifying unit 10 to control the operation of the amplifying unit 10. When a scan signal is applied to the scan line Scan, the amplifying unit 10 operates to amplify the first current ID1 generated by the photodiode D1. Also, a data output line D-out is connected to the amplifying unit 10. The first current ID1 amplified by the amplifying unit 10 is output through the data output line D-out.

The voltage compensating unit 20 adjusts the potential of the cathode of the photodiode D1 according to an ambient temperature. The voltage compensating unit 20 includes a first capacitor C1, a voltage generating unit 21, a temperature measuring unit 22, and a dark diode D2.

The dark diode D2 is a photodiode blocked from receiving external light, for example, by being entirely encased in an opaque housing. The dark diode D2 includes an anode and a cathode, and a second ground voltage VSS2 is applied to the anode. Since light is not incident on the dark diode D2, second current ID2 which is affected only by the ambient temperature is generated. However, it is understood that aspects of the invention are not limited to using the dark diode D2, and any element in which a voltage or current depends on the ambient temperature can be used. Such an element used in place of the dark diode D2 can be the same type of an element that is used in place of the photodiode D1, or can be an element that has a temperature-dependent voltage or current characteristic that is substantially similar to or proportional to or a temperature-dependent voltage or current characteristic of the element that is used in place of the photodiode D1.

The temperature measuring unit 22 measures the ambient temperature by sensing the second current ID2 generated by the dark diode D2. The voltage generating unit 21 generates a compensation voltage based on the measured ambient temperature. That is, the magnitude of the compensation voltage is determined based on the ambient temperature measured by the temperature measuring unit 22. The voltage generating unit 21 includes an input terminal and an output terminal. A change in the potential of the cathode of the dark diode D2 is applied as an input to the input terminal, and the generated compensation voltage is output from the output terminal.

The first capacitor C1 uses coupling to adjust the potential of the first node N1, which is also the potential of the cathode of the photodiode D1. The first capacitor C1 includes a first terminal connected to the first node N1, and a second terminal connected to the output terminal of the voltage generating unit 21. Once a compensation voltage is generated by the voltage generating unit 21, the potential of the first node N1 to which the first terminal of the first capacitor C1 is connected is changed due to the property of the first capacitor C1 that tries to maintain a voltage between the first and second terminals of the first capacitor C1. The output terminal of the voltage generating unit 21 is connected to the cathode of the dark diode D2 to perform a feedback operation as described in detail below.

The light sensing circuit may further include a second capacitor (not shown) having a first terminal connected to the output terminal of the voltage generating unit 21 and a second terminal connected to the cathode of the dark diode D2 in place of the connection between the output terminal of the voltage generating unit 21 and the cathode of the dark diode D2 shown in FIG. 2. The second capacitor performs a feedback operation to keep the potential of the cathode of the dark diode D2 constant.

The light sensing circuit may further include a switch (not shown) connected between the first terminal and the second terminal of the second capacitor (not shown). When the switch is turned on, such as by a reset signal (not shown), the first terminal and the second terminal of the second capacitor may be short-circuited, thereby discharging the second capacitor. That is, since the voltage compensating unit 20 can return to its initial state due to the discharging of the capacitor, the switch may be used to initialize the voltage compensating unit in response to the reset signal. The reset signal will be explained later with reference to FIGS. 3 and 4.

The operation of the light sensing circuit of FIG. 2 will now be explained. The first current ID1 is generated according to the brightness of incident light and ambient temperature by the photodiode D1. The second current ID2 is generated according to the ambient temperature by the dark diode D2. Electrons are emitted from the cathodes of the photodiode D1 and the dark diode D2, thereby lowering the potentials of the cathodes of the photodiode D1 and the dark diode D2.

The temperature measuring unit 22 measures the ambient temperature by sensing a change in the potential of the cathode of the dark diode D2 or the second current ID2 generated by the dark diode D2, and outputs a signal corresponding to the determined ambient temperature. The signal may be an analog signal or a digital signal, and may be a voltage or current.

The voltage generating unit 21 receives the signal output from the temperature measuring unit 22 and generates a compensation voltage corresponding to the ambient temperature. The compensation voltage is used to return the potential of the cathode of the dark diode D2 to its original state. That is, the temperature measuring unit 22 and the voltage generating unit 21 operate together as a negative feedback device. The temperature measuring unit 22 and the voltage generating unit 21 may be separate devices as shown in FIG. 2, or may be one device for performing a temperature measuring function and a voltage generating function. For example, the operations of the voltage generating unit 21 and the temperature measuring unit 22 may be performed based on the fact that as a voltage applied to an inverting input terminal of an op amp changes, a voltage output from an output terminal of the op amp changes.

When the compensation voltage corresponding to the ambient temperature is output from the voltage generating unit 21, the first capacitor C1 increases the potential of the first node N1 in order to maintain a voltage between the first and second terminal terminals of the first capacitor C1. The compensation voltage is determined based on a drop in the potential of the cathode of the dark diode D2. That is, the compensation voltage that is based on only the second current ID2 generated due to the ambient temperature is used to compensate for a change in the potential of the first node N1 due to an ambient temperature current component generated by the ambient temperature in the first current ID1.

Since the ambient temperature current component generated due to the ambient temperature is removed from the first current ID1 generated by the photodiode D1, the brightness of the incident light can be accurately measured.

Figure 3:
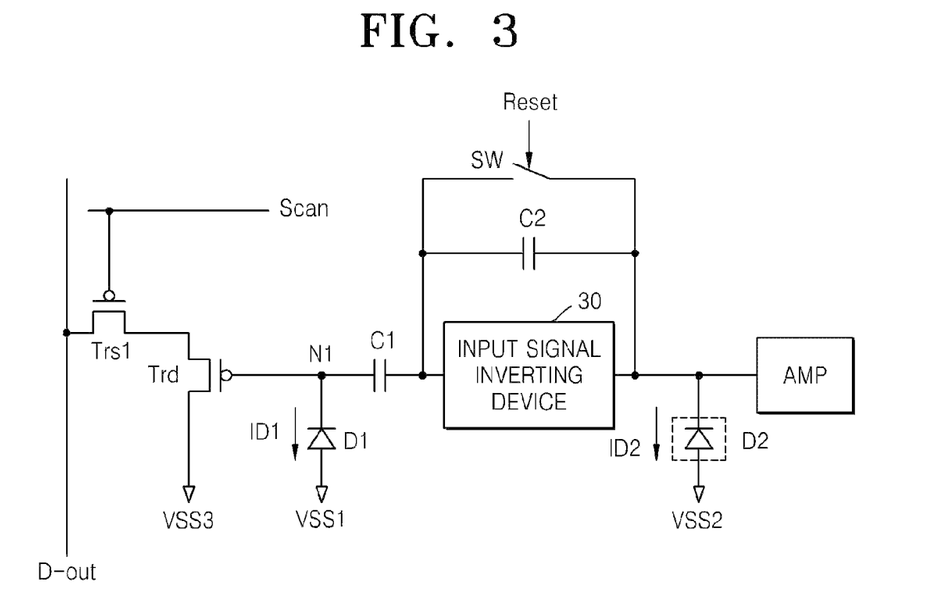
FIG. 3 shows a light sensing circuit according to an aspect of the invention.
Figure 4:
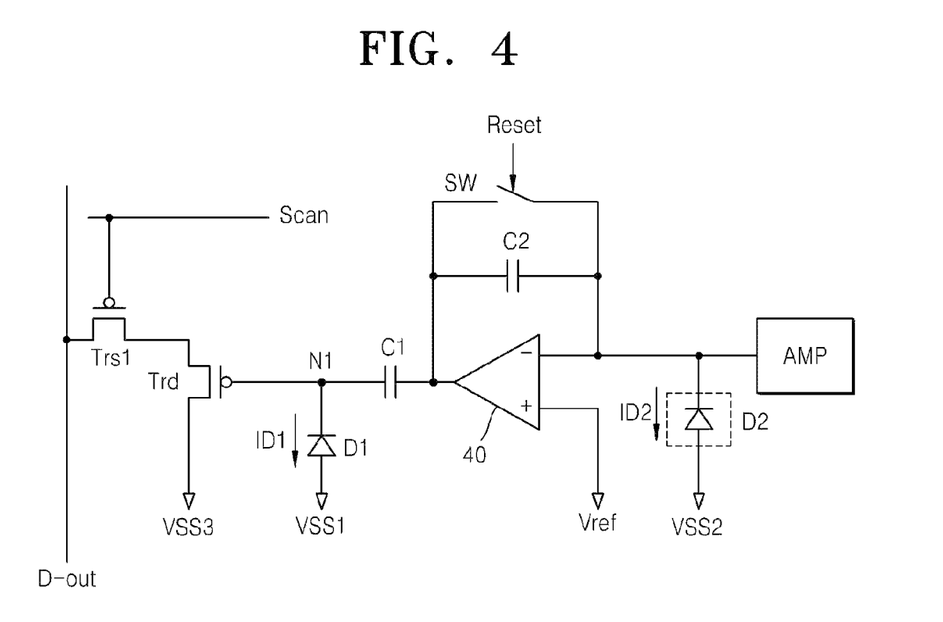
FIG. 4 shows a light sensing circuit according to an aspect of the invention.

FIGS. 3 and 4 show light sensing circuits according to other aspects of the invention. Referring to FIGS. 3 and 4, each of the light sensing circuits includes a photodiode D1, a driving transistor Trd, a first switching transistor Trs1, a first capacitor C1, and a voltage compensating unit. The voltage compensating unit includes an input signal inverting device 30, a second capacitor C2, a switch SW, and a dark diode D2. In FIG. 4, the input signal inverting device 30 is an op amp 40. The configuration and operation of each of the light sensing circuits of FIGS. 3 and 4 will now be explained by focusing on the differences between these light sensing circuits and the light sensing circuit of FIG. 2.

The photodiode D1 receives external light and generates a first current ID1. The photodiode D1 includes an anode and a cathode. A first ground voltage VSS1 is applied to the anode of the photodiode D1, and the cathode of the photodiode D1 is connected to a first node N1.

The driving transistor Trd generates a brightness current corresponding to the first current ID1 generated by the photodiode D1. The driving transistor Trd includes a first electrode, a gate electrode, and a second electrode. A third ground voltage VSS3 is applied to the first electrode of the driving transistor Trd. The gate electrode of the driving transistor Trd is connected to the first node N1 and senses a change in the potential of the first node N1 due to the current ID1 generated by the photodiode D1.

The first switching transistor Trs1 is a switching device controlling an output of the brightness current generated by the driving transistor Trd. The first switching transistor Trs1 includes a first electrode, a gate electrode, and a second electrode. The first electrode of the first switching transistor Trs1 is connected to the second electrode of the driving transistor Trd, the gate electrode of the first switching transistor Trs1 is connected to a scan line Scan, and the second electrode of the first switching transistor Trs1 is connected to a data output line D-out.

The first capacitor C1 uses coupling to adjust the potential of the first node N1, which is also the potential of the cathode of the photodiode D1. The first capacitor C1 includes a first terminal connected to the first node N1, and a second terminal connected to an output terminal of the input signal inverting device 30 that will be explained later.

The voltage compensating unit applies a compensation voltage to the second terminal of the first capacitor C1. The voltage compensating unit includes the input signal inverting device 30, the second capacitor C2, the switch SW, and the dark diode D2.

The dark diode D2 is a photodiode that is blocked from receiving external light. The dark diode D2 includes an anode and a cathode, and a second ground voltage VSS2 is applied to the anode. Since light is not incident on the dark diode D2, the dark diode D2 generates a second current ID2 that is affected only by ambient temperature.

The input signal inverting device 30 inverts input current or voltage and outputs the inverted current or voltage. The input signal inverting device 30 includes an input terminal and the output terminal. The input signal inverting device 30 may be an op amp 40 as shown in FIG. 4. In this case, an inverting input terminal of the op amp 40 may be the input terminal of the input signal inverting device 30, and an output terminal of the op amp 40 may be the output terminal of the input signal inverting device 30. Also, a reference voltage Vref is applied to a non-inverting input terminal of the op amp 40 to keep the potential of the cathode of the dark diode D2 constant. The magnitude of the reference voltage Vref must be greater than that of the second ground voltage VSS2.

The second capacitor C2 includes a first terminal connected to the output terminal of the input signal inverting device 30 or the op amp 40, and a second terminal connected to the input terminal of the input signal inverting device 30 or the inverting input terminal of the op amp 40, thereby enabling a feedback operation to be performed.

The switch SW is connected between the first and second terminals of the second capacitor C2 so that the first and second terminals of the second capacitor C2 are short-circuited when the switch SW is turned on. The switch SW is turned on by a reset signal. The reset signal may be repeatedly applied at predetermined intervals. For example, whenever the light sensing circuit performs an operation of sensing the brightness of incident light periodically, the reset signal may be applied to the switch SW with same period.

The operation of the light sensing circuits of FIGS. 3 and 4 will now be explained. The first current ID1 is generated according to the brightness of incident light and ambient temperature by the photodiode D1. The second current ID2 is generated according to the ambient temperature by the dark diode D2. As the first current ID1 and the second current ID2 are generated, the potentials of the cathodes of the photodiode D1 and the dark diode D2 are lowered.

Since the input terminal of the input signal inverting device 30 or the inverting input terminal of the op amp 40 is connected to the cathode of the dark diode D2, a change in the potential of the cathode of the dark diode D2 may be sensed by the input signal inverting device 30 or the op amp 40.

The input signal inverting device 30 or the op amp 40 outputs a compensation voltage, which changes in a direction opposite to a direction in which the potential of the input terminal changes, from the output terminal according to the change in the potential of the input terminal. For example, in FIG. 4, the reference voltage Vref is applied to the non-inverting input terminal of the op amp 40. The potential of the cathode of the dark diode D2 is lowered due to the generation of the second current ID2. A potential difference between the non-inverting input terminal and the inverting input terminal of the op amp 40 occurs due to the drop in the potential of the cathode of the dark diode D2. Since the potential difference occurs in a negative direction, a compensation voltage which changes in a positive direction is generated and output from the output terminal of the op amp 40. The potential of the first terminal of the second capacitor C2 increases due to the compensation voltage, and thus the potential of the second terminal of the second capacitor C2 also increases. The potential of the cathode of the dark diode D2 returns to its original state before the second current ID2 is generated due to the increase in the potentials of the first and second terminals of the second capacitor C2.

The first capacitor C1 operates in the same manner as the second capacitor C2 to increase the potential of the first node N1. Since the compensation voltage is output based on the second current ID2 that is generated and affected only by the ambient temperature, the compensation voltage can be used to compensate for a change in the potential of the first node N1 due to an ambient temperature current component generated by the ambient temperature in the first current ID1.

Since the ambient temperature current component generated due to the ambient temperature is removed from the first current ID1 generated by the photodiode D1, the brightness of the incident light can be accurately measured.

Figure 5:
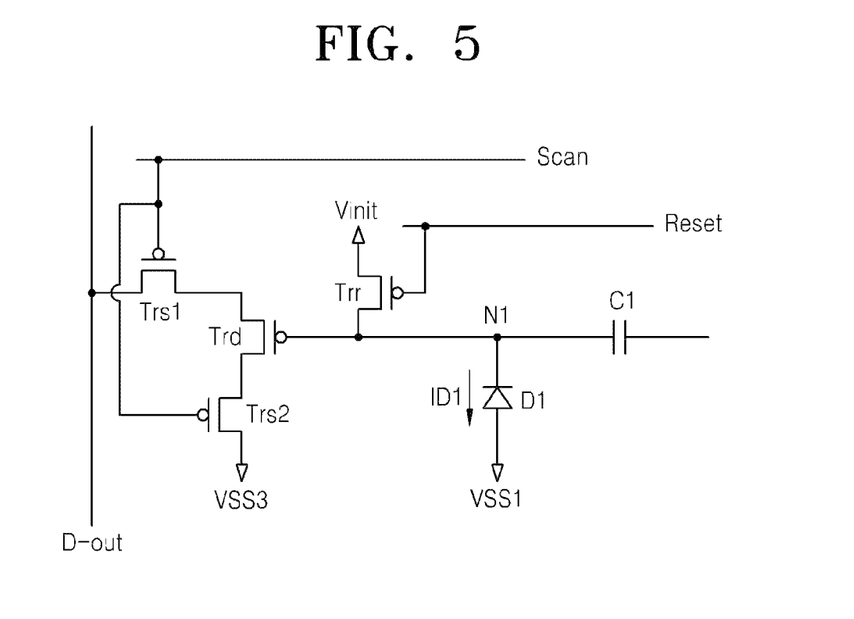
FIG. 5 shows a light sensing circuit according to an aspect of the invention.

FIG. 5 shows a light sensing circuit according to another aspect of the invention. Referring to FIG. 5, the light sensing circuit further includes a reset transistor Trr and a second switching transistor Trs2 in addition to all of the elements of either of the light sensing circuits of FIGS. 3 and 4. The voltage compensating unit that is connected to the second terminal of the first capacitor C1 is not shown for convenience of description.

The reset transistor Trr applies an initialization voltage Vinit to the cathode of the photodiode D1, that is, to the first node N1. The reset transistor Trr includes a first electrode, a second electrode, and a gate electrode. The first electrode of the reset transistor Trr is connected to the first node N1, the initialization voltage Vinit is applied to the second electrode, and a reset signal is applied to the gate electrode. The light sensing circuit of FIG. 5 includes a reset line Reset through which the reset signal is transmitted.

When the reset transistor Trr is turned on by the reset signal, the initialization signal Vinit is applied to the first node N1, and thus a voltage applied to the cathode of the photodiode D1 is initialized. By periodically applying the reset signal, the light sensing circuit can repeatedly sense the brightness of incident light. The reset signal may be the same as the reset signal described above with regard to the switch SW of each of the light sensing circuits of FIGS. 2 through 4. Accordingly, if the reset signal is applied through the reset line Reset, the dark diode D2, the input signal inverting device 30, and the second capacitor C2 as well as the photodiode D1 are initialized.

The second switching transistor Trs2 includes a first electrode, a second electrode, and a gate electrode. The first electrode of the second switching transistor Trs2 is connected to the third ground voltage VSS3, the second electrode of the second switching transistor Trs2 is connected to the first electrode of the driving transistor Trd, and the gate electrode of the second switching transistor Trs2 is connected to the scan line Scan. Since the light sensing circuit of FIG. 5 includes the second switching transistor Trs2, the driving transistor Trd is floated while the light sensing circuit senses incident light. As a result, the driving transistor Trd can be prevented from operating while a scan signal is not applied from the scan line Scan.

Figure 6:
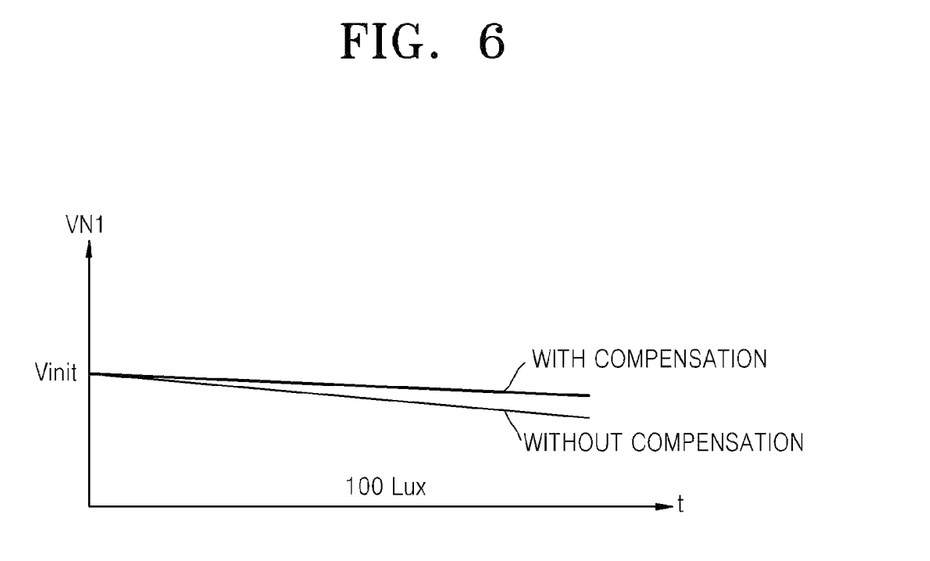
FIG. 6 is a graph showing a relationship between time and the potential of a first node of a light sensing circuit according to an aspect of the invention.

FIG. 6 is a graph showing a relationship between time and the potential of a first node N1 of a light sensing circuit according to an aspect of the invention. In FIG. 6, the horizontal axis represents a time for which the light sensing circuit has sensed incident light, and the vertical axis represents the voltage of the first node N1.

The voltage of the first node N1 before incident light is sensed is an initialization voltage Vinit. The voltage of the first node N1 with voltage compensation using a voltage compensating unit is higher the voltage of the first node N1 without voltage compensation as time goes by. That is, it is found that since an ambient temperature current component generated due to ambient temperature is removed, only a current component actually generated according to the brightness of incident light affects a change in the potential of the first node N1.

Figure 7:
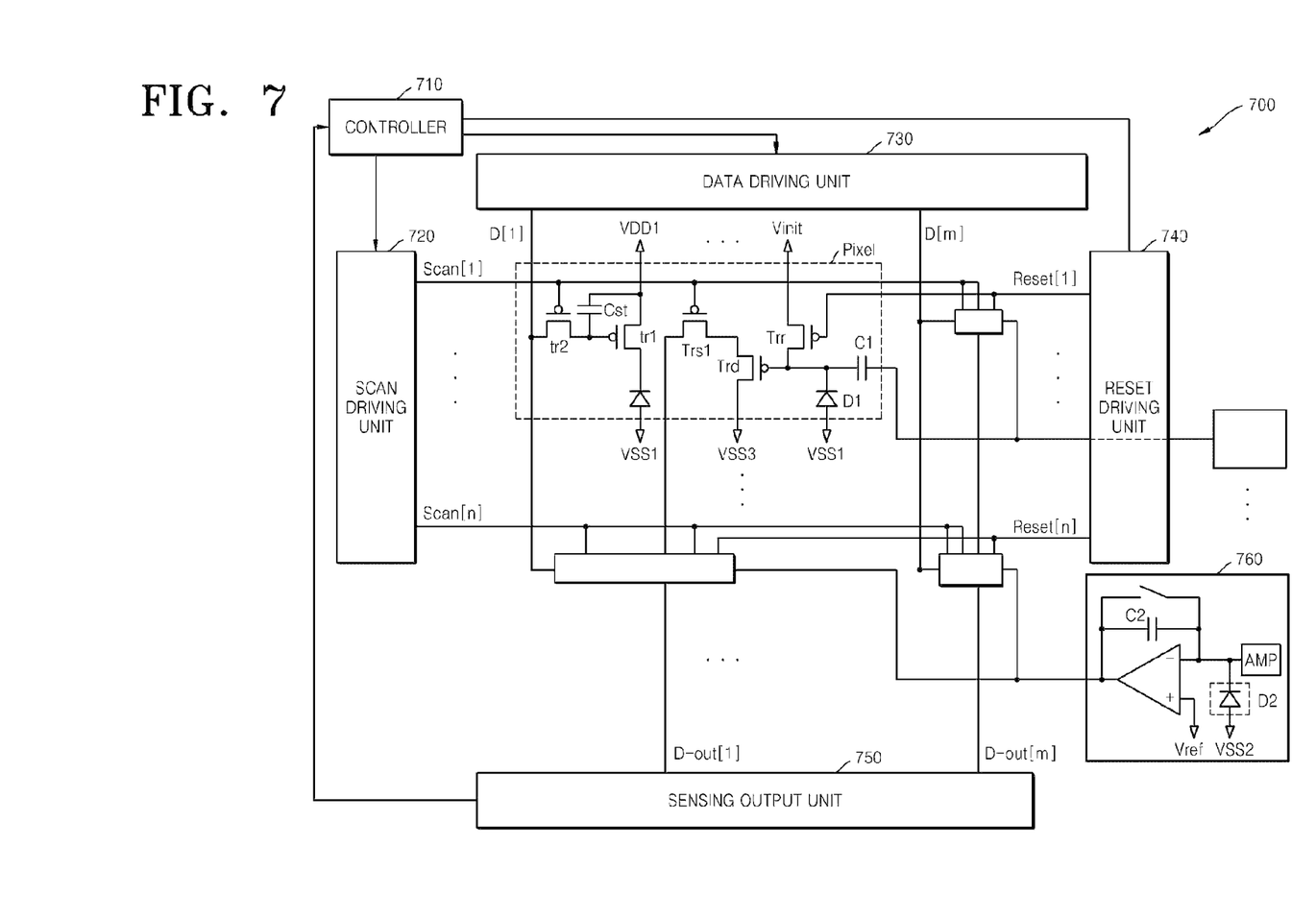
FIG. 7 shows a touch panel including a light sensing circuit according to an aspect of the invention.

FIG. 7 shows a touch panel 700 including a light sensing circuit according to an aspect of the invention. Referring to FIG. 7, the touch panel 700 includes a controller 710, a scan driving unit 720, a data driving unit 730, a reset driving unit 740, a sensing output unit 750, and a plurality of voltage compensating units 760. Also, the touch panel 700 includes a display unit including a plurality of pixels arranged in an n×m matrix. Also, the touch panel 700 includes n scan lines Scan[1] through S[n] and n reset lines Reset[1] through Reset[n] arranged in rows, and m data lines D[1] through D[m] and m data output lines D-out[1] through D-out[m] arranged in columns. Each of the pixels includes a display circuit and a light sensing circuit.

The display circuit of FIG. 7 is a display circuit of an organic light emitting diode (OLED) display device. The OLED display device can be a stand-alone display device, such as a television, a computer monitor, an automated teller machine (ATM), etc., or a touch display device for a portable device such as a phone, a remote control, a personal digital assistant (PDA), a portable media player, a game, etc. The display circuit is a 2 transistor-1 capacitor pixel circuit including a first transistor tr1, a second transistor tr2, a third capacitor Cst, and an organic light emitting diode. The display circuit displays data in the same manner as a display circuit of a conventional OLED display device, and thus a detailed explanation of the operation of the display circuit will be omitted. However, it is understood that aspects of the invention are not limited to the display circuit of FIG. 7, and any conventional display circuit may be used.

The light sensing circuit of FIG. 7 includes the light sensing circuit of FIG. 5 except for the second switching transistor Trs2. However, it is understood that aspects of the invention are not limited to the light sensing circuit of FIG. 7, and various modifications may be made.

A scan signal used to select the display circuit may be the same as a scan signal used to select the light sensing circuit, and accordingly the display circuits and the light sensing circuits may share the scan lines Scan[1] through S[n].

The controller 710 controls the operations of the scan driving unit 720, the data driving unit 730, the reset driving unit 740, and the sensing output unit 750. Also, the controller 710 may detect the location of a touch on the touch panel 700 based on brightness data received from the sensing output unit 750. For example, the controller 710 may determine a spot where brightness is significantly lower or higher among all of the brightness data as the location of the touch.

The scan driving unit 720 applies a scan signal to the scan lines Scan[1] through S[n]. The scan signal is sequentially applied to the scan lines Scan[1] through S[n], and the data driving unit 730 applies a data signal to the display circuits in synchronization with the scan signal through the data lines D[1] through D[m]. The data signal may be output from a voltage source or a current source in the data driving unit 730. Since the display circuits and the light sensing circuits share the scan lines Scan[1] through S[n], the light sensing circuits of a row that is selected by the scan signal apply a brightness current Iout to the sensing output unit 750 when the first switching transistor Trs1 is turned on.

The reset driving unit 740 applies a reset signal to the reset lines Reset[1] through Reset[n]. The reset signal is sequentially applied to the reset lines Reset[1] through Reset[n] after the scan signal is applied, and an initialization voltage Vinit is applied to the first node N1 in synchronization with the reset signal. Also, when a switch SW included in the voltage compensating unit 760 is turned on by the reset signal, the dark diode D2, the second capacitor C2, etc., may be initialized as described in detail above in connection with FIGS. 3 and 4.

The sensing output unit 750 receives the brightness current Iout through the data output lines D-out[1] through D-out[m] from the light sensing circuits of the row that is selected by the scan signal. The brightness current Iout is converted into brightness data by the sensing output unit 750. For example, the brightness current Iout may be applied to a capacitor, a voltage across the capacitor may be detected, and the detected voltage may be converted into brightness data. Alternatively, the brightness current Iout may be detected and converted into brightness data. However, it is understood that aspects of the invention are not limited to the methods of obtaining brightness data described above, and any method of converting the brightness current Iout into brightness data may be used. The brightness data is provided to the controller 710, and the controller 710 determines whether there has been a touch on the touch panel 700 based on the brightness data.

The voltage compensating unit 760 may be the voltage compensating unit of any of the light sensing circuits of FIGS. 2 through 5. Although the first capacitor C1 is included in each of the pixels in FIG. 7, it is understood that aspects of the invention are not limited to such a configuration. A separate voltage compensating unit 760 may be provided for each of the rows of light sensing circuits. Accordingly, a substrate may be formed so that a first capacitor C1 is provided in the each of the voltage compensating units 760, and the first capacitor C1 in each of voltage compensating units 760 is shared by the light sensing circuits in a respective one of the rows of light sending circuits.

Accordingly, since the display circuit and the light sensing circuit can be simultaneously formed in the same process, manufacturing of the touch panel can be simplified. Since an additional panel is not necessary, the thickness of the touch panel can be reduced. Also, since the display circuit and the light sensing circuit can share scan lines, the number of driving devices for generating a driving signal and the number of wires required to drive the touch panel can be reduced.

Although several embodiments of the invention have been shown and described, it would be appreciated by those skilled in the art that various changes may be made in these embodiments without departing from the principles and spirit of the invention, the scope of which is defined in the claims and their embodiments.

What is claimed is:

1. A light sensing circuit comprising:
   a photodiode to receive external light, the photodiode comprising an anode and a cathode;
   an amplifying unit to amplify a current generated by the photodiode due to the received external light at an ambient temperature; and
   a voltage compensating unit to adjust a voltage of the cathode of the photodiode based on the ambient temperature, the voltage compensating unit comprising a second photodiode blocked from receiving the external light.

2. The light sensing circuit of claim 1, wherein the voltage compensating unit further comprises:
   a voltage generating unit to generate a compensation voltage based on a current generated by the second photodiode at the ambient temperature, the voltage generating unit comprising an input terminal and an output terminal; and
   a first capacitor comprising a first terminal connected to the cathode of the photodiode, and a second terminal connected to the output terminal of the voltage generating unit.

3. The light sensing circuit of claim 2, wherein:
   the voltage compensating unit further comprises a temperature measuring unit to measure the ambient temperature by sensing the current generated by the second photodiode, and
   the voltage generating unit determines a magnitude of the compensation voltage based on the ambient temperature measured by the temperature measuring unit.

4. The light sensing circuit of claim 2, further comprising a second capacitor comprising a first terminal connected to the output terminal of the voltage generating unit, and a second terminal connected to a cathode of the second photodiode.

5. The light sensing circuit of claim 4, further comprising a switch connected between the first terminal of the second capacitor and the second terminal of the second capacitor.

6. A light sensing circuit comprising:
   a photodiode comprising an anode and a cathode;
   a driving transistor comprising a gate electrode connected to the cathode of the photodiode, a first electrode to receive a first ground voltage, and a second electrode;
   a first switching transistor comprising a first electrode connected to the second electrode of the driving transistor, a second electrode to output a data signal, and a gate electrode to receive a scan signal;
   a first capacitor comprising a first terminal connected to the cathode of the photodiode, and a second terminal; and
   a voltage compensating unit to apply a compensation voltage to the second terminal of the first capacitor, the voltage compensating unit comprising a second photodiode blocked from receiving an external light.

7. The light sensing circuit of claim 6, wherein the voltage compensating unit comprises:
   a voltage supply device comprising an input terminal and an output terminal;
   a second capacitor comprising a first terminal connected to the output terminal of the voltage supply device, and a second terminal connected to the input terminal of the voltage supply device; and
   the second photodiode comprising a cathode connected to the input terminal of the voltage supply device, and an anode to receive a second ground voltage.

8. The light sensing circuit of claim 7, wherein the voltage supply device comprises an input signal inverting device.

9. The light sensing circuit of claim 8, wherein the input signal inverting device comprises an operational amplifier.

10. The light sensing circuit of claim 7, further comprising a switch connected between the first terminal of the second capacitor and the second terminal of the second capacitor.

11. The light sensing circuit of claim 6, further comprising a reset transistor comprising a first electrode connected to the cathode of the photodiode, a second electrode to receive an initialization voltage, and a gate electrode to receive a reset signal.

12. The light sensing circuit of claim 6, further comprising a second switching transistor comprising a gate electrode to receive the scan signal, a first electrode to receive the first ground voltage, and a second electrode connected to the first electrode of the driving transistor.

13. A method of driving a light sensing circuit that senses a brightness of external light incident on a photodiode based on a current generated by the photodiode due to the incident light at an ambient temperature, the method comprising:
   measuring the ambient temperature;
   removing an ambient temperature current component from the current generated by the photodiode based on the measured ambient temperature,
   wherein the removing of the ambient temperature current component comprises:
      generating a compensation voltage based on the measured ambient temperature; and
      applying the compensation voltage to a cathode of the photodiode; and
   wherein the measuring of the ambient temperature comprises measuring the ambient temperature using a second photodiode blocked from receiving the external light.

14. A touch panel comprising:
a plurality of light sensing circuits;
a plurality of scan lines to transmit a scan signal to the plurality of light sensing circuits;
a plurality of reset lines to transmit a reset signal to the plurality of light sensing circuits; and
a plurality of data output lines to output a brightness current from the plurality of light sensing circuits;
wherein each of the plurality of light sensing circuits comprises:
a photodiode comprising an anode and a cathode;
a driving transistor comprising a gate electrode connected to the cathode of the photodiode, a first electrode to receive a first ground voltage, and a second electrode;
a first switching transistor comprising a first electrode connected to the second electrode of the driving transistor, a second electrode connected to one of the data output lines, and a gate electrode connected to one of the scan lines;
a first capacitor comprising a first terminal connected to the cathode of the photodiode, and a second terminal; and
a voltage compensating unit to apply a compensation voltage to the second terminal of the first capacitor, the voltage compensating unit comprising a second photodiode blocked from receiving an external light.

15. The touch panel of claim 14, further comprising a scan driving unit connected to the plurality of scan lines to supply the scan signal.

16. The touch panel of claim 14, further comprising a reset driving unit connected to the plurality of reset lines to supply the reset signal.

17. The touch panel of claim 14, further comprising a sensing output unit connected to the plurality of data output lines to receive the brightness current and output brightness data of light incident on the light sensing circuits.

18. The touch panel of claim 17, further comprising a controller to determine a location of a touch on the touch panel based on the brightness data.

19. The touch panel of claim 14, further comprising:
a plurality of display circuits;
a plurality of data lines to transmit a data signal to the plurality of display circuits; and
a data driving unit connected to the plurality of data lines to supply the data signal.

20. The touch panel of claim 19, wherein each of the plurality of display circuits comprises a pixel circuit of an organic light emitting diode display device.

* * * * *